April 2, 1935.  H. H. STYLL  1,996,086
OPHTHALMIC LENS
Filed Jan. 3, 1933
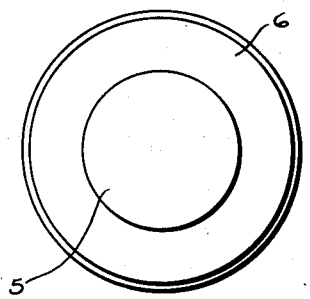
FIG. I
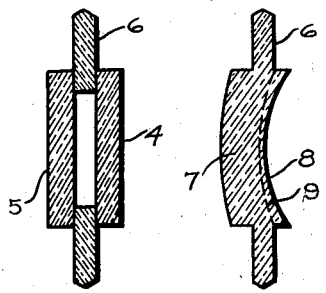
FIG. II   FIG. III
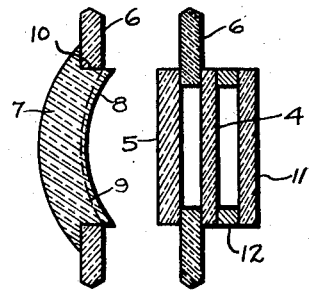
FIG. IV   FIG. V
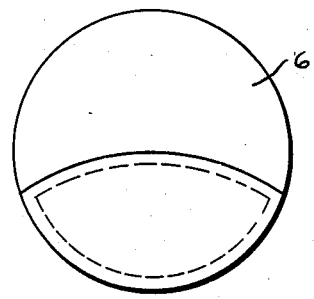
FIG. VI
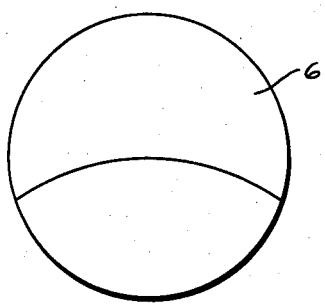
FIG. VII
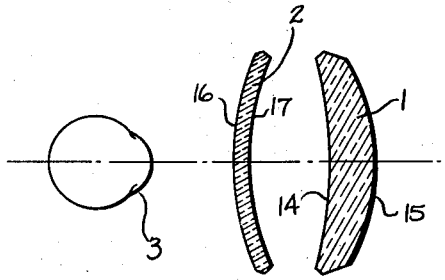
FIG. VIII
INVENTOR
Harry H. Styll.

Patented Apr. 2, 1935

1,996,086

UNITED STATES PATENT OFFICE 1,996,086

OPHTHALMIC LENS

Harry H. Styll, Southbridge, Mass., assignor to American Optical Company, Southbridge, Mass., a voluntary association of Massachusetts Application January 3, 1933, Serial No. 649,956

9 Claims. (Cl. 88—54)

This invention relates to improvements in lenses and has particular reference to improved lenses for changing the size of image without change of focus and to an improved process for making the same.

One of the principal objects of the invention is to provide lenses of this character of a reduced size and weight to facilitate their mounting and use and to provide improved means of making them.

Other objects and advantages of the invention will become apparent from the following description taken in connection with the accompanying drawing. It will be apparent that many changes may be made in the details of construction and arrangement of parts and the steps in the process without departing from the spirit of the invention as expressed in the accompanying claims. I, therefore, do not wish to be limited to the exact matter shown and described as the preferred forms only have been set forth by way of illustration.

Referring to the drawing:

Fig. I is a front view of a lens embodying the invention.

Fig. II is a cross section showing one form of the lens.

Fig. III is a view similar to Fig. II but showing another form of the invention.

Fig. IV is a view similar to Fig. II, showing yet another form of the invention.

Fig. V is a view similar to Fig. II, showing another form of the invention.

Fig. VI is a front view of a modified form of the invention.

Fig. VII is a view similar to Fig. VI of a modified form of the invention, and

Fig. VIII is a diagrammatic view in section showing the relation of the lens to the eye.

Lenses having an optical correction for size of image without change of focus have been recently put in use. Due to the fact that such lenses have usually been made in the form of a lens system of separate pieces or lenses they have been very ungainly, of poor appearance, heavy, and difficult to mount before the eye. Due to the fact that an additional correction has been added to those that have been employed up to the present, difficulty will be experienced from excessive weight and size, even when the lens is made in a single piece. It is, therefore, one of the main objects of my invention to obtain the advantages of such a lens and at the same time reduce the present difficulties of size, weight, and looks, as has been referred to above.

Referring to the drawing in which similar reference characters represent similar parts thoughout:

In Fig. VIII I have shown an elementary lens of two parts designed to change the size of image without change of power. The eye is shown at 3. The element 1 is the ordinary prescription lens having the surfaces 14 and 15 designed in the usual prior art way for corrections of sphere, cylinder and prism, one, all, or any. The element 2 is the element that provides the change in size of image without change of power. It has the surfaces 16 and 17 arranged as follows:

The relationship of the surfaces 16 and 17 is such as to provide no optical power but a magnification. These surfaces may be flat, spherical, aspherical, or cylindrical. The amount of change in size depends upon the curvatures of the two surfaces and the thickness of the element. Where change in size of the two major meridians is desired, spherical surfaces are used; when change in one meridian only is desired, cylindrical surfaces are used. Such a lens element as is well known produces size change without power change. In such a lens element the two surfaces, in order to produce no optical power, are nearly concentric or substantially equal. The explanation of this is that in the practical range of ophthalmic lenses equal surfaces and concentric surfaces are substantially alike. An infinitely thin lens with equal surfaces produces no power, but increase of thickness does produce some power but in the practical range of ophthalmic lenses it is very small and a very small alteration of a surface will compensate the thickness, as for example, a lens 3 mm. thick having a 6.00 diopter front surface would have a 6.07 diopter rear surface for no power, hence, by substantially equal surfaces and nearly concentric surfaces is meant herein surfaces that will produce no power with the desired thickness.

When the concave side of the element 2 is placed nearest the eye the size of image is increased; when the convex side of the element 2 is nearest the eye the size of the image is decreased. The desired change in size is obtained by the relationship of the two surfaces of the element and the thickness thereof, by well understood optical rules. The magnification in a no optical power element is due to the bending or curving of the element. If an object is viewed through a plane parallel the effect of this plane parallel is negligible. If, however, we bend the plane parallel, as happens when it is ground on different base curves, a magnification will be produced. The element 2 is so curved or bent to give desired magnification.

For description of lenses of this nature see article entitled "Lenses for changing the size and shape of dioptric images" by Ames Glidden, and Ogle of the Department of Research in Physiological Optics, Dartmouth Medical School, Hanover, New Hampshire, contained in a pamphlet reprint from The Annals of the Distinguished Service Foundation of Optometry, Boston, Massachusetts, 1932, page 27.

This type of lens may be made of separate pieces, as shown, or it may be incorporated in a single piece under certain circumstances and with certain types of lens surfaces such as nonspherical or noncylindrical curves, termed aspheric surfaces. These lenses as made up to this time have been of the separate piece type and they have been so large and heavy as to be very objectionable and disfiguring in use, to the extent of making their use almost impracticable.

In Figs. I and II I have illustrated a lens, the surfaces being shown straight instead of curved for convenience of illustration, having the prescription lens 4 of the character of the lens 1 of Fig. VIII, and the size lens 5 of the character of the lens 2 of Fig. VIII. Between the lenses 4 and 5 is secured the holder support 6, preferably of glass, but other substances can be used. The support 6 may be cemented in place, or fused to the lenses, or otherwise secured. The lenses 4 and 5 are reduced in size in the plane of the lens to reduce marginal thickness and the weight. The support 6 is shaped to fit the eyeglass mounting, or to a desired shape of lens if a rimless mounting is used.

In Fig. III the correction lens 7 has been made in one piece. The support part 6 is here shown integral with the correction lens, but it may be made separately and secured to the lens. The surface 8 is aspheric, departing from the regular surface 9.

In Fig. IV the lens 7 is like the lens of Fig. III but the support 6 is made of a separate piece and the lens is recessed at 10 to receive the support. The parts may be fused or cemented together.

I make my lens 7 from a single piece of lens medium such as optical glass and calculate the surfaces thereof to include with the regular required corrections the correction for change in magnification without change in focus.

The considerations determining these calculations are as follows: First, considering vision through the center of the lens and disregarding for the moment oblique or marginal vision, the optical consideration is to obtain a power or powers and a magnification without change of focus in one piece of lens medium. In the lens itself there are three things that may be varied: the first side of the lens, the second side of the lens, and the thickness of the lens. In the nature of things, the thickness cannot be varied very much, as the lens must not be too heavy. To start, I select a good thickness, thus leaving the two surfaces of the lens that may be worked upon to produce the required results and into these I must work my requirements of power correction and magnification.

If it is necessary to correct the oblique or marginal vision there are two more equations to satisfy, namely the vision in the two meridians of the marginal point. Hence, there are now four things to be taken into account, and only two surfaces to which they can be applied, as the thickness is only variable to a slight extent. Study of these conditions will show that only the central vision with these requirements can be obtained with regular or spherical surfaces, that is, a surface the cross section of which is a circle either of finite or infinite radius.

If the oblique vision is to be corrected there must be a departure from these regular surfaces. The cross section of the surface will have to depart from a circle, which surface I have denoted herein as an aspheric surface.

I then determine whether this aspheric surface will have to be placed on one or on both sides of the lens. These aspheric surfaces are difficult to grind and polish so it is a consideration to use such a curve on one side only of the lens unless results are such as to make the more expensive proceeding advisable.

It is clear that many combinations of different forms of regular surfaces on one side and aspheric or atoric surfaces on the other may be made, such as sphere, cylinder, prism, toric, plano on one side, aspheric or atoric on the other, or atoric or aspheric on both sides or combined with each other but in such instances the curves are calculated to include the correction for change in magnification without change in focus.

It is clear if an aspheric curve is adopted on one side that an extra variable has been introduced and if on both sides then two extra variables have been found which give a total of four, and a partial one in the variation in thickness, so that the four equations may be satisfied. The only surfaces permissible are smooth continuous unfolded curves as those with sharp corners etc. cannot be used. With this introduction of additional variable good oblique vision can be obtained with practically perfect central vision.

In calculating the lens surfaces the central vision is first calculated in the two major meridians and then the oblique vision on a marginal spot in the two major meridians. The spherical surfaces are calculated by the usual trigonometric formula well known to the mathematical lens designers of the prior art as set forth in various text books on the subject. The aspheric computation in general must be made by an algebraic expression of the departure of that surface from a sphere, such as found in standard treatises on aspheric curves, with higher expansions if necessary to increase the accuracy. The surfaces are calculated for the desired optical corrections including that of change of magnification without change of focus to produce the required mathematical curves to produce the required result. In general it will be endeavored to place the aspheric surface on one side of the lens only, with the curvatures equal in the two major meridians. Departures are only made where the desired results require the use of both lens surfaces or both meridians of one surface.

The following references may be consulted on the computation of aspheric surfaces and the production of aspheric lens surfaces:

Über Asphärische Flächen In Optischen Instrumenten, by Allvar Gullstrand, printed by Almquist & Wiksells Boktryckeri A-B., 1919.

Untersuchungen Zur Geometrischen Optik, by K. Schwarzschild, printed by Druck der Dieterich'shen Univ.-Buchdruckerei in Göttingen 1905.

U. S. patent to Von Rohr, No. 949,501, Feb. 15, 1910.

In Fig. V is shown a lens like Fig. II with the addition of an additional lens element 11 with a separator 12 between it and the lens element 4. The parts may be cemented or fused together. The lens element 11 gives additional surfaces for corrective purposes if desired or needed. In some instances it may be made a prism element.

In Fig. VI I have shown the corrective lens occupying the bottom part of the device instead of the central part as shown in Fig. I.

In Fig. VII is shown a lens similar to Fig. VI except that the correction lens is made in one piece.

It is clear that the correction lens may be placed in any desired positional relationship with the support 6.

The support 6 is shaped to the desired lens shape and may or may not be formed with a focal and/or magnification correction as desided and the edges bevelled to fit a frame or mounting.

With lenses of the character described, lighter and more graceful and better looking lenses are obtained and they may be fitted in the regular way to simple and good appearing mountings.

It will be understood that the separate lens elements may be made of glasses of any desired indices of refraction and that the said elements may be secured together by uniting their entire peripheral edges or by uniting the said edges only at a few selected spots. This uniting depends largely upon the shape and curvatures of the elements.

From the foregoing it will be seen that I have provided simple, efficient and inexpensive means for obtaining all the advantages of the invention and for performing its objects.

Having described my invention, I claim:

1. A lens comprising a lens element having optical surfaces on its two faces of substantially the same curvature, said element having substantially no optical focal power, a lens element having curved optical surfaces on its two faces, said surfaces being substantially different in curvature and having focal power, said two elements being aligned one with the other with their adjacent surfaces separated by a distance to give the required optical properties of the two elements, and a filler piece of optical glass filling the marginal space between the elements but not the central portion thereof, and a third lens element having optical surfaces on its faces aligned with the other two elements and spaced from one of them and a filler piece between said last two elements.

2. A lens comprising a lens element having optical surfaces on its two faces of substantially the same curvature, said element having substantially no optical focal power, a lens element having curved optical surfaces on its two faces, said surfaces being substantially different in curvature and having focal power, said two elements being aligned one with the other with their adjacent surfaces separated by a distance to give the required optical properties of the two elements, and a filler piece of optical glass filling the marginal space between the elements but not the central portion thereof, said filler piece being extended beyond the margin of the edges of said two elements, and a third lens element having optical surfaces on its faces aligned with the other two elements and spaced from one of them and a filler piece between said last two elements, said filler piece being not extended beyond the margins of the lens elements.

3. A lens comprising a lens system having opposed concavo-convex optical surfaces upon its faces, the algebraic sum of said surfaces being equal optically to a lens system comprising two superimposed lens units, one in front of the other, one of said units having optical surfaces on its two faces of substantially the same curvature and deflected from a flat plane by an amount to give a required magnification and having substantially no optical power and the other unit having curved optical surfaces on its two faces, said surfaces being substantially different to produce a required focal power and a carrier piece of optical glass extending outwardly from the marginal edges of said system, the peripheral contour of said carrier piece in size and shape being that of an ordinary prescription ophthalmic lens, and the lens system portion thereof being spaced internally of the marginal edges of the carrier piece and occupying only a fractional part of the extent of the whole lens.

4. A lens comprising an optical power portion and a non-lenticular supporting portion, the size and contour of the supporting portion being that of an ordinary prescription ophthalmic lens and the power portion spaced internally of the marginal edges of the supporting portion and occupying only a fractional part of the extent of the whole lens, said power portion projecting beyond the surface of the supporting portion on each side thereof and separated therefrom by a shoulder of substantial thickness, said power portion having opposed concavo-convex optical surfaces on its faces, the algebraic sum of which is equal optically to a lens system comprising two superimposed lens units, one in front of the other, one of said units having optical surfaces on its two faces of substantially the same curvature and deflected from a flat plane by an amount to give a required magnification and having substantially no optical power and the other unit having curved optical surfaces on its two faces, said surfaces being substantially different to produce a required focal power.

5. A lens comprising two field portions, one of said portions being of the peripheral size and contour of ordinary prescription ophthalmic lenses and the other of said portions occupying only a portion of the extent of the first portion and having optical surfaces on its opposed faces, said opposed surfaces being concavo-convex of required focal power having an algebraic sum equal optically to a lens system comprising two superimposed lens units, one in front of the other, one of said units having optical surfaces on its two faces of substantially the same curvature and deflected from a flat plane by an amount to give a required magnification and having substantially no optical power and the other unit having curved optical surfaces on its two faces, said surfaces being substantially different to produce a required focal power.

6. A lens comprising two field portions, one of said portions being of the peripheral size and contour of ordinary prescription ophthalmic lenses and the other of said portions occupying only a portion of the extent of the first portion and comprising a plurality of lens units supported by the said first portion, one of said units having optical opposed concavo-convex surfaces on its faces, said surfaces being of substantially the same curvature and deflected away from a flat plane by an amount to introduce a required magnification, and another of said units having optical opposed concavo-convex surfaces on its faces, said surfaces having a substantial difference in curvature from each other, said difference being an amount to produce a required focal power, the algebraic sum of all of said surfaces being equal to the required focal power but said units having a thickness and a bending away from a flat plane different from the bending of a lens of said required focal power having focal power alone whereby is included the required magnification in said second portion.

7. A lens comprising two field portions, one of said portions being of the peripheral size and contour of ordinary prescription ophthalmic lenses and the other of said portions occupying only a portion of the extent of the first portion and comprising a plurality of lens units supported by the said first portion, one of said units having optical opposed concavo-convex surfaces on its faces, said surfaces being of substantially the same curvature and deflected away from a flat plane by an amount to introduce a required magnification and another of said units having optical opposed concavo-convex surfaces on its faces, said surfaces having a substantial difference in curvature from each other, said difference being an amount to produce a required focal power, the algebraic sum of all of said surfaces bing equal to the required focal power but said units having a thickness and a bending away from a flat plane different from the bending of a lens of said required focal power having focal power alone whereby is included the required magnification in said second portion, and another unit having opposed optical surfaces aligned with said second portion.

8. A lens comprising two fields, one field extending beyond the edge of the other, one of said fields being a field for supporting the other and having finished optical surfaces of desired optical power on its two faces, the supported field being a lens system optically equivalent to two superimposed lens units, one in front of the other wherein one of said units has optical surfaces on its two faces of substantially the same curvature and has substantially no optical focal power and being deflected from a flat plane by an amount to produce a required magnification, and the other unit has curved optical surfaces on its two faces, said surfaces being substantially different in curvature to an amount to produce a required focal power, the deflection of the lens units away from a flat plane being different from the deflection from a flat plane of a lens of the same optical power without magnification.

9. A lens comprising two fields, one field extending beyond the edge of the other, one of said fields being a field for supporting the other and one of said fields being a lens system optically equivalent to two separate aligned lens units, one in front of the other wherein one of said units has optical surfaces on its two faces of substantially the same curvature and has substantially no optical focal power and being deflected from a flat plane by an amount to produce a required magnification and the other unit having curved optical surfaces on its two faces, said surfaces being substantially different in curvature by an amount to produce a required focal power, the deflection of the lens units away from a flat plane being different from the deflection from a flat plane of a lens of the same optical power without magnification.

HARRY H. STYLL.